(12) United States Patent
Bertram et al.

(10) Patent No.: US 6,434,613 B1
(45) Date of Patent: Aug. 13, 2002

(54) SYSTEM AND METHOD FOR IDENTIFYING LATENT COMPUTER SYSTEM BOTTLENECKS AND FOR MAKING RECOMMENDATIONS FOR IMPROVING COMPUTER SYSTEM PERFORMANCE

(75) Inventors: Randal Lee Bertram, Raleigh; Gregory Joseph McKnight, Chapel Hill, both of NC (US)

(73) Assignee: International Business Machines Corporation, Armonk, NJ (US)

( * ) Notice: Subject to any disclaimer, the term of this patent is extended or adjusted under 35 U.S.C. 154(b) by 0 days.

(21) Appl. No.: 09/255,955

(22) Filed: Feb. 23, 1999

(51) Int. Cl.[7] .............................................. G06F 13/00
(52) U.S. Cl. ........................ 709/223; 709/220; 709/225
(58) Field of Search ................................. 709/202, 203, 709/220, 223, 224, 225, 226, 219, 328

(56) References Cited

U.S. PATENT DOCUMENTS

| | | | | |
|---|---|---|---|---|
| 5,963,943 A | * | 10/1999 | Cummins et al. ............. | 707/10 |
| 6,085,243 A | * | 7/2000 | Fletcher et al. ............. | 709/224 |
| 6,112,238 A | * | 8/2000 | Boyd et al. ................. | 709/224 |
| 6,148,335 A | * | 11/2000 | Haggard et al. ............ | 709/224 |
| 6,154,766 A | * | 11/2000 | Yost et al. .................. | 709/201 |
| 6,167,446 A | * | 12/2000 | Lister et al. ................ | 709/223 |
| 6,282,267 B1 | * | 8/2001 | Nolting ....................... | 379/34 |

* cited by examiner

Primary Examiner—Viet D. Vu
(74) Attorney, Agent, or Firm—J. Bruce Schelkopf

(57) ABSTRACT

A system and method of monitoring and analyzing the performance of a server and its components in a data processing network and for proposing changes to the network to improve the performance. The system involves identifying bottlenecks in the system, determining which bottlenecks are the most severe in affecting the performance of the system and in proposing changes to the components of the system to improve performance of the network. Identification of latent bottlenecks caused by fixing other bottlenecks and creating a more efficient system is a part of the present invention, using a second, lower threshold for identifying latent bottleneck when a realized bottleneck has also been identified in a system.

11 Claims, 16 Drawing Sheets

FIG. 3
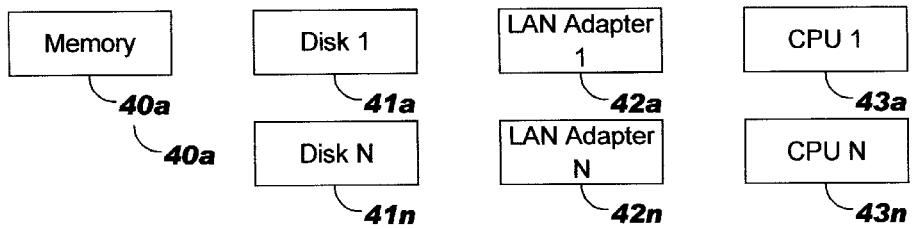
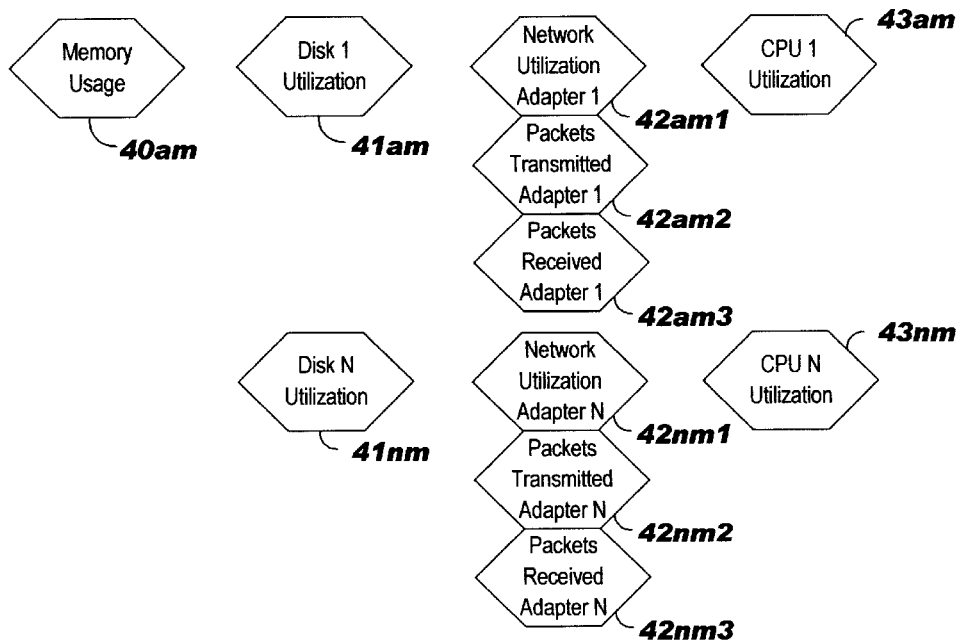
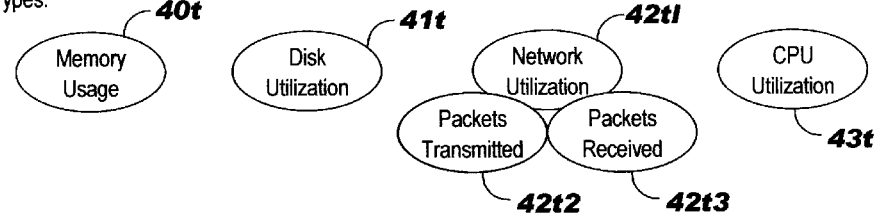

FIG. 6

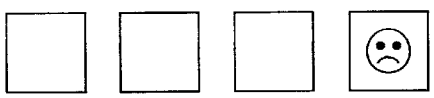

| Performance Analysis Recommendations |
|---|
| System E Go to details |
| Bottleneck: LAN Adapter. To improve performance: |
| • Add faster LAN technology to LAN Segment 0. |
| • Add another LAN adapter and migrate users from LAN Segment 0 to the new LAN subnet. |
| |
| System B Go to details |
| Bottleneck: CPU. To improve performance: |
| • Upgrade to faster or additional CPUs. |

| Monitors | System C |
|---|---|
| CPU Utilization | Disk 1: Utilization |
| Disk 1: Utilization | |
| Disk 2: Utilization | 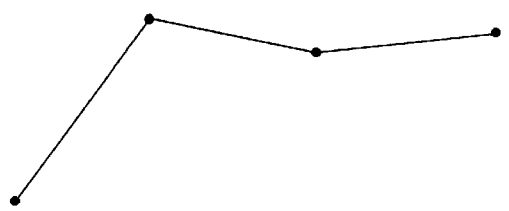 |
| Drive C: Space Remaining | |
| Drive D: Space Remaining | |
| Locked Memory | |
| Memory Usage | |
| NDIS - Adapter 0 - Packets Rec | |
| NDIS - Adapter 0 - Packets Tran | |
| Segment 0 - Network Utilization | |

FIG. 7

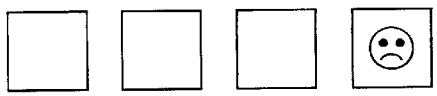

System B Details
Bottleneck: CPU. This bottleneck occurred 119 out of the 189 hours that this system was analyzed, or 63% of the time. It was observed between Tue 11 Aug 1998 10:00 EDT and Mon 31 Aug 1998 10:00 EDT.

To graph the constrained resources, click on:
• CPU Utilization (constrained for 100% of the 119 hours of bottleneck time)

To improve performance:
• Upgrade to faster or additional CPUs.

System C Details

| Monitors | System C<br>Disk 1: Utilization |
|---|---|
| CPU Utilization | |
| Disk 1: Utilization | 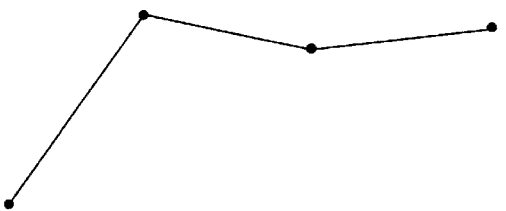 |
| Disk 2: Utilization | |
| Drive C: Space Remaining | |
| Drive D: Space Remaining | |
| Locked Memory | |
| Memory Usage | |
| NDIS - Adapter 0 - Packets Rec | |
| NDIS - Adapter 0 - Packets Tran | |
| Segment 0 - Network Utilization | |

FIG. 8

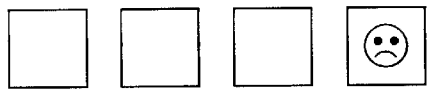

System B Details
Bottleneck: CPU. This bottleneck occurred 119 out of the 189 hours that this system was analyzed, or 63% of the time. It was observed between Tue 11 Aug 1998 10:00 EDT and Mon 31 Aug 1998 10:00 EDT.

To graph the constrained resources, click on:
• CPU Utilization (constrained for 100% of the 119 hours of bottleneck time)

To improve performance:
• Upgrade to faster or additional CPUs.

System C Details

| Monitors |
|---|
| CPU Utilization |
| Disk 1: Utilization |
| Disk 2: Utilization |
| Drive C: Space Remaining |
| Drive D: Space Remaining |
| Locked Memory |
| Memory Usage |
| NDIS - Adapter 0 - Packets Rec |
| NDIS - Adapter 0 - Packets Tran |
| Segment 0 - Network Utilization |

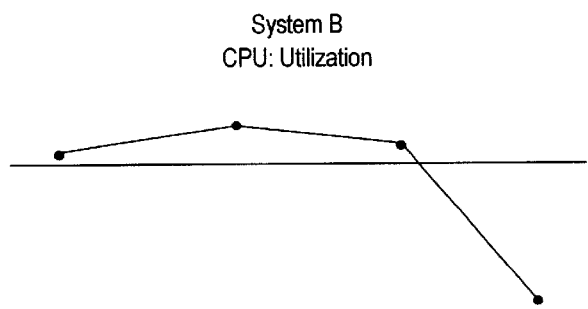

SYSTEM AND METHOD FOR IDENTIFYING LATENT COMPUTER SYSTEM BOTTLENECKS AND FOR MAKING RECOMMENDATIONS FOR IMPROVING COMPUTER SYSTEM PERFORMANCE

CROSS REFERENCE TO RELATED PATENTS

The present invention is related to an invention "Method and System for Providing Performance Data", as described in a pending patent application serial number 09/089,109 filed Jun. 2, 1998 by Randal Bertram et al. This patent is sometimes referred to as the Performance Data Patent.

The present invention is also related to "Method and System for Graphically Displaying Trend and Range Data for a Variety of Systems" as described in a pending patent application serial number 09/088,525 filed Jun. 2, 1998 by Randal Bertram et al. This patent is sometimes referred to herein as the Performance Display Patent.

A concurrently-filed patent application Ser. No. 09/256,680 filed Feb. 23, 1999, entitled "System and Method for Predicting Computer System Performance and Making Recommendations for Improving its Performance", by inventors Bertram, Krauss and McKnight, may also be relevant to the subject matter of this patent. This patent is sometimes referred to as the Performance Prediction Patent.

A concurrently-filed patent application Ser. No. 09/256,452, filed Feb. 23, 1999, entitled "System and Method for Monitoring and Analyzing Computer System Performance and Making Recommendations for Improving Performance", by the inventors of the present patent may also be relevant to the present invention. This patent is sometimes referred to as the System Recommendation Patent.

The Performance Data Patent, the Performance Display Patent, the Performance Prediction Patent and the System Recommendation Patent are all assigned to the assignee of the present invention and the specification and drawings of each patent are specifically incorporated herein by reference.

FIELD OF INVENTION

The present invention relates to capacity management in a computer system such as a network or server and, more particularly, to a method and system for analyzing the performance of components of a computer system and applying rules to the results to identify bottlenecks as well as potential (or latent) bottlenecks resulting from improving system performance to remove other bottlenecks and to make recommendations for ameliorating the actual and latent bottlenecks.

BACKGROUND ART

Managing a computer system which includes a plurality of devices such as networks or servers is of special interest to data processing (or information technology) personnel. The computer systems typically include a plurality of diverse devices such as memory, disks, local area network (LAN) adapters and central processing units (CPUs) which interact in various interrelated ways when a variety of data processing applications are used in the computer system. As the systems get larger and more complex, these interactions become hard to define, model or predict the relationships between the devices, and hence the capacity of the system becomes difficult to manage. These systems are quite expensive to install and changes to the system involve a significant investment, so, while an investment is desirable which will improve the performance of the computer system, some investments in improvements to the computer system would not be worthwhile since the performance of the overall system would not improve.

Frequently, the performance of the computer system or network is less than it could be because only or more of the components is not appropriate for application loading of the computer system (or a network or server). It is desirable to know what changes to the computer system would be worthwhile in improving the capacity of the computer system and making those changes while avoiding changes which would not have a significant benefit to the performance of the computer system.

One way to address the proper components for the loading of the system is to provide a model of the load and simulate the system to provide an optimum (or desirable) combination of elements. While there are numerous simulation techniques, they all rely on approximations of the loading and the components, and, as the systems become larger and more complex and the loading becomes more complex, the simulations are approximations whose accuracy and reliability is subject to significant doubt.

Another approach to predicting performance of a complex computer system involves active monitors, or adding a known load to an existing system and measuring the resulting output and effect of the load. This requires that the system be available for experimentation and that the added load operate in a known manner, both of which are assumptions that may work in some instances but not in others. For example, BlueCurve Dynameasure by BlueCurve, Inc. Intentionally induces an artificial workload to determine performance characteristics of a computer system. Such an active monitor is disruptive to the network (in that it interferes, at least to some extent, with the ongoing work of the computer system and the artificial load on the network may not accurately reflect the real world actual work of the computer system, either now or in the future.

Another way to manage the capacity is described in the Performance Management Patent and involves sampling of indicators of system activity. These indicators can be displayed as described in the Performance Display Patent, if desired. In any event, the data must be interpreted by a professional who has experience in looking at the results and interpreting the data to make recommendations. Unfortunately, these experts are in demand and not enough exist, so it is unlikely that a network expert would be available to analyze the results and to make suggestions for improvement at any given time and having the local expert is an inefficient use of his time and expertise.

Accordingly, the prior art systems for capacity management are limited and have undesirable limitations and disadvantages.

SUMMARY OF THE INVENTION

The present invention overcomes the limitations and disadvantages of the prior art systems by providing an improved capacity management system which is easy to use and which provides an indication of the bottleneck(s) in the system, in an ordered list, along with recommendations on how to improve the computer system, based on the use of passive monitors.

The improved capacity management system uses data which is typically available from hardware and software and uses software tools which are typically available. Thus, it is not necessary to find some obscure data on the computer systems or to add additional overhead (such as additional hardware or new software) to the computer system in order to obtain the necessary data to make recommendations on improving the computer system.

The present system has the advantage that it does not require a simulation program and it does not require that the user find or create unusual sets of data (like artificial loads of an active monitoring system like BlueCurve Dynameasure) which other prior art capacity management systems may require for analysis.

The present system avoids the need for consulting with an expert in the field of analyzing computer system performance to look at the various data which is available on the performance of the computer system and make judgments of whether the system has bottlenecks and whether changes to the system could make a significant improvement to its performance.

The present invention has the advantageous effect that the recommendations can be sorted according to rules, such as addressing the most severe problem first, and can be combined so that the same problem is reported only once.

The computer system of the present invention has the benefit that interactions between the performance of different parts of the system are taken into consideration during the analysis and the recommendations. The present invention also takes into consideration that a system may be operating at less than its optimal performance due to a bottleneck, and, when this is remedied, another bottleneck, referred to as a latent bottleneck, may occur. This is because a system which has a bottleneck condition is operating at less than its full speed, and when the bottleneck is removed, the entire system will operate better, making those performance factors that are above a second or lower threshold likely to exceed the higher threshold when the first bottleneck is remedied.

The present invention also has the advantage that certain periods of performance (like evenings and/or weekends) may be disregarded, if desired, in order to avoid the impact on the analysis of periods not particularly relevant to the users of the system. That is, the periods of greatest concern to the users can be focused on, either completely or with appropriate emphasis, and periods of lesser importance can be ignored or considered less important.

The disclosed computer system also has the capability of averaging system performance over a period of time to prevent peak periods of short duration from unduly influencing the data and the conclusions about the performance of the system. As with other monitors, the duration of the averaging may be adjusted by the user, if desired.

The present invention has the further advantage that the results can be made available over an Internet or intranet using hypertext markup language (HTML) format so that the results can be monitored from a remote site. The use of information in HTML format allows additional information (such as backup information and graphs, additional details, or a source of further information, such as an expert) to be made available by hot-links as well.

One further advantage of the present invention is that additional detail on the results can be added, such as warnings as to the strength of the recommendations and the confidence in the recommendations. If certain monitors are not present or have data only for a limited time, the results may be less reliable than if the same information was available over a longer period of time, and the system of the present invention has the advantage of providing information on the quality of the data on which the recommendations are made.

The present invention also has the advantage that the indicators are programmable and the definition of a bottleneck may be changed by the user. In this way, the user has his choice of a predetermined definition of a bottleneck or the use of his own customized version of a bottleneck. The present invention also includes preset parameters which define reliable data, but, again, the user can override these parameters, if desired, to customize his system.

The invention is an automated method of detecting and diagnosing computer system latent bottlenecks utilizing passive monitoring techniques. A latent bottleneck is a bottleneck that is suppressed by another bottleneck. Typically when the realized bottleneck is alleviated, the latent bottleneck will become realized.

This invention builds on the Performance Data Patent and the System Recommendation Patent. It has the advantages listed in these disclosures, plus the following: It tells the user what new bottleneck to expect after the current one is remedied. It is common for a system administrator to successfully fix a bottleneck, only to discover that a second bottleneck was waiting behind the first one and must also be fixed immediately. The user who knows about the second bottleneck ahead of time can be prepared to fix both at once. Detecting latent bottlenecks improves the quality of recommendations for alleviating realized bottlenecks because these recommendations are more likely to yield appreciable gains in system performance. It detects and diagnoses the latent bottlenecks using the same mechanism as the realized bottlenecks. No additional input is required since it uses the same monitor types, diagnoses, and report. The output has the same format and features as the realized bottlenecks. It works with the forecasted data such as are provided by the Performance Prediction Patent as well as with real data, so that latent bottlenecks can be forecasted.

Other objects and advantages of the present invention will be apparent to those skilled in the relevant arts in view of the following description of the drawings, taken together with the accompanying drawings and the appended claims.

BRIEF DESCRIPTION OF THE DRAWINGS

The following is a description of the present invention, described with reference to the accompanying drawings in which:

FIG. 3 is an illustration of the monitors and monitor types which may be used in the present invention, for a system which includes the components and component types shown.

FIGS. 5, 6, 7 and 8 are views of illustrative reports created by the process described in reference to the flow chart of FIG. 4.

DETAILED DESCRIPTION OF THE PREFERRED EMBODIMENT

The following description is full and informative description of the best method and system presently contemplated for carrying out the present invention which is known to the inventors at the time of filing the patent application. Of course, many modifications and adaptations will be apparent to those skilled in the relevant arts in view of the following description in view of the accompanying drawings and the appended claims. While the system and method described herein are provided with a certain degree of specificity, the present invention could be implemented with either greater or lesser specificity, depending on the needs of the user. Further, some of the features of the present invention could be used to advantage without the corresponding use of other features described in the following paragraphs. As such, the present description should be considered as merely illustrative of the principles of the present invention and not in limitation thereof, since the present invention is defined solely by the claims which follow.

The present invention relates to an improvement in providing information about the capacity of a computer system and whether or not the system is constrained, or limited, by a performance-limiting condition which has sometimes been referred to as a bottleneck. In the event that one or more bottlenecks are detected, then the system provides an indication of the bottleneck as well as one or more recommendations for improving the performance of the computer system by alleviating the bottleneck(s). The following description is presented to enable a man of ordinary skill in the art to make and use the invention and is provided in the context of the requirement for obtaining a patent. The present description is the best presently-contemplated method for carrying out the present invention. Various modifications to the preferred embodiment will be readily apparent to those skilled in the arts and the generic principles of the present invention may be applied to other embodiments, and some features of the present invention may be used without the corresponding use of other features. Accordingly, the present invention is not intended to be limited to the embodiment shown but is to be accorded the scope consistent with the principles and features described herein.

Figure 1A:
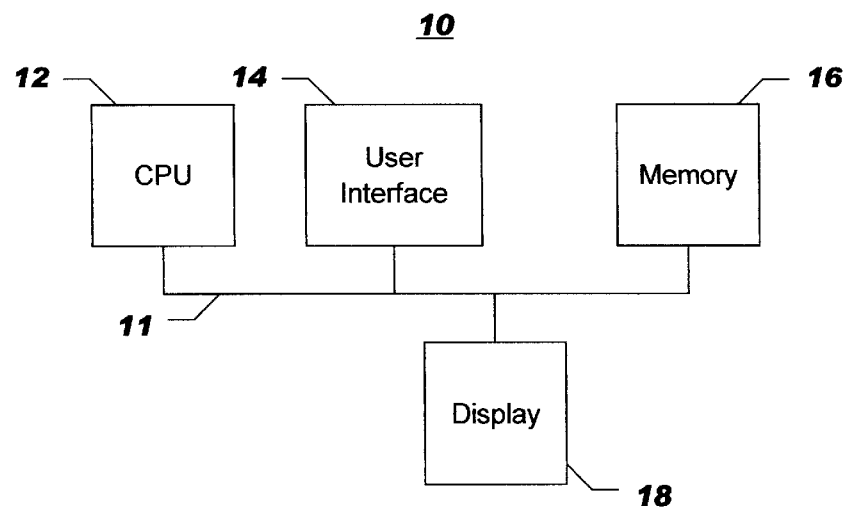
FIG. 1A is a block diagram of a computer system illustrative of the environment of the present invention.

FIG. 1A is a block diagram of a computer system 10 useful in the present invention. The computer system 10 includes a central processor unit (CPU) 12 coupled to a system bus 11. Also coupled to the system bus 11 are a user interface 14, a memory 16 and a display 18. The user can input information to the computer system 10 through the user interface 14 and the display 18 allows the user to view information from the system 10, for example, in graphical or text form (or, in some cases, in both forms).

Figure 1B:
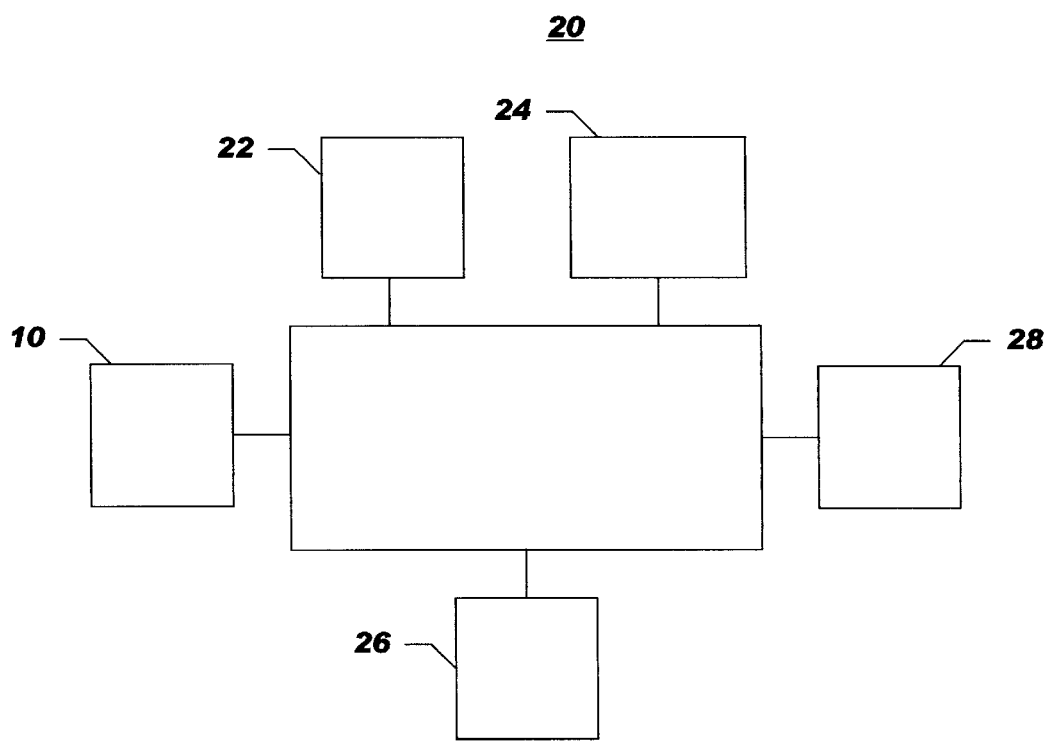
FIG. 1B is a block diagram of a computer network of the type used with the present invention.

FIG. 1B shows a block diagram of a data transmission network 20 (sometimes simply referred to as a network) of the type which may be used with the present invention. The data transmission network 20 includes the computer system 10 FIG. 1A as well as other components 22, 24, 26 and 28. These components could be other computer systems, servers, printers or other computer apparatus. Although this figure depicts a network of five devices, in actuality, the network may include a variable number of components, from a small number (1 or 2) in an unusual situation to a very large number (thousands of systems).

Referring to FIGS. 1A and 1B, a user of the computer system 10 may wish to view the performance of the network 20 on his display 18. The performance of the network 20 may be of concern to the network administrator, for example, in managing the performance of the network 20. Applications which reside on the user's system 10 (but are not shown) allow a query of the systems, attached to the network 20 to receive performance data on the system. This performance data, which are typically referred to as monitors, are time-varying information on the activity sensed at some point in the network, and may be an indication of the use of a resource, either in absolute memory amount (such as messages transmitted) or in relative terms (the portion of the memory which is used).

Figure 2:
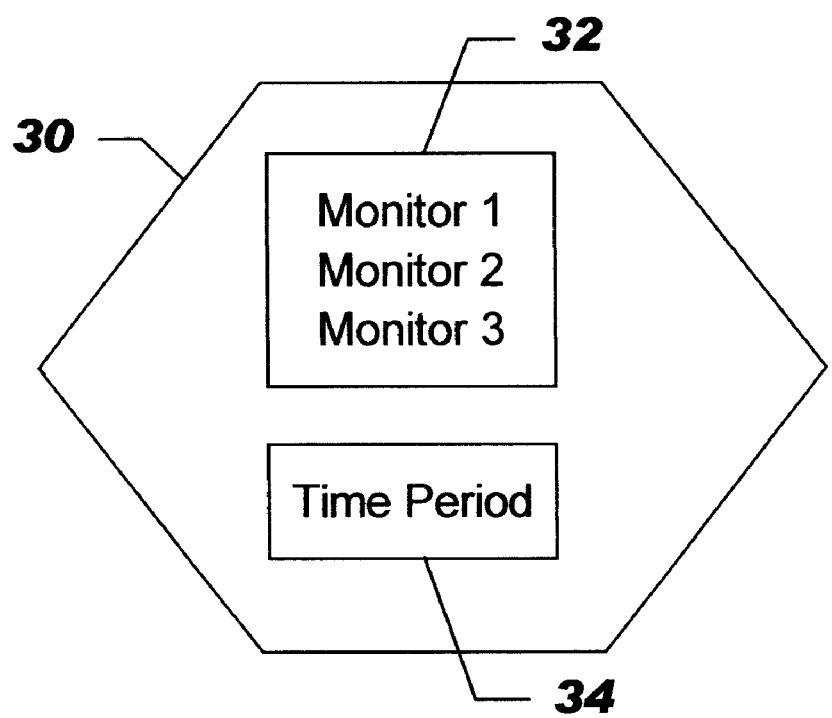
FIG. 2 is a view of a display showing a reporting of monitors used in the previous versions of a monitor reporting system.

FIG. 2 is a diagram of a prior art system for viewing the performance of a computer system. In response to an inquiry, various monitors (shown here as monitor 1, monitor 2 and monitor 3) are displayed in a box 32, along with the time period displayed in box 34. A separate inquiry at another time or listing other monitors would display the requested monitors at the requested time in a subsequent display, leaving the synthesis to the user to put the data together and reach appropriate conclusions.

FIG. 3 is an illustration of the component types which may be present in a computer system, which may include individual servers, networks and other components such as printers. The component types include memory 40, disk(s) 41, LAN adapter(s) 42, and central processor unit(s) or CPU 43. The memory type 40 is shown as a single memory 40a, with the disk 40 consisting of disk 1 (41a) through disk n (41n). The LAN adapter 42 includes LAN adapter 1 (42a) through LAN adapter n (42n) and the CPU is shown with CPU 1 (43a) through CPU n (43n). Associated with each of the components is at least one monitor, with the added subscript "m" added to designate the monitor associated with a given device—e.g., the monitor for memory usage 40am is associated with the memory 40a. Since there are several monitors for the LAN adapter 42a, these are indicated as a first monitor—utilization—(42am1) through a third monitor—packets received—(42am3). The monitors can be grouped into types, such as memory usage 40T, disk utilization 41t, etc., corresponding to the respective monitors. The monitor types for the network can include network utilization 42t1, packets transmitted 42t2 amd packets received 42t3. CPU utilization 43t is the type of monitor associated with the CPU monitor.

FIG. 4 (consisting of FIGS. 4A, 4B, 4C and 4D) is a flow chart of process used in the preferred embodiment of the present invention.

Figure 4A:
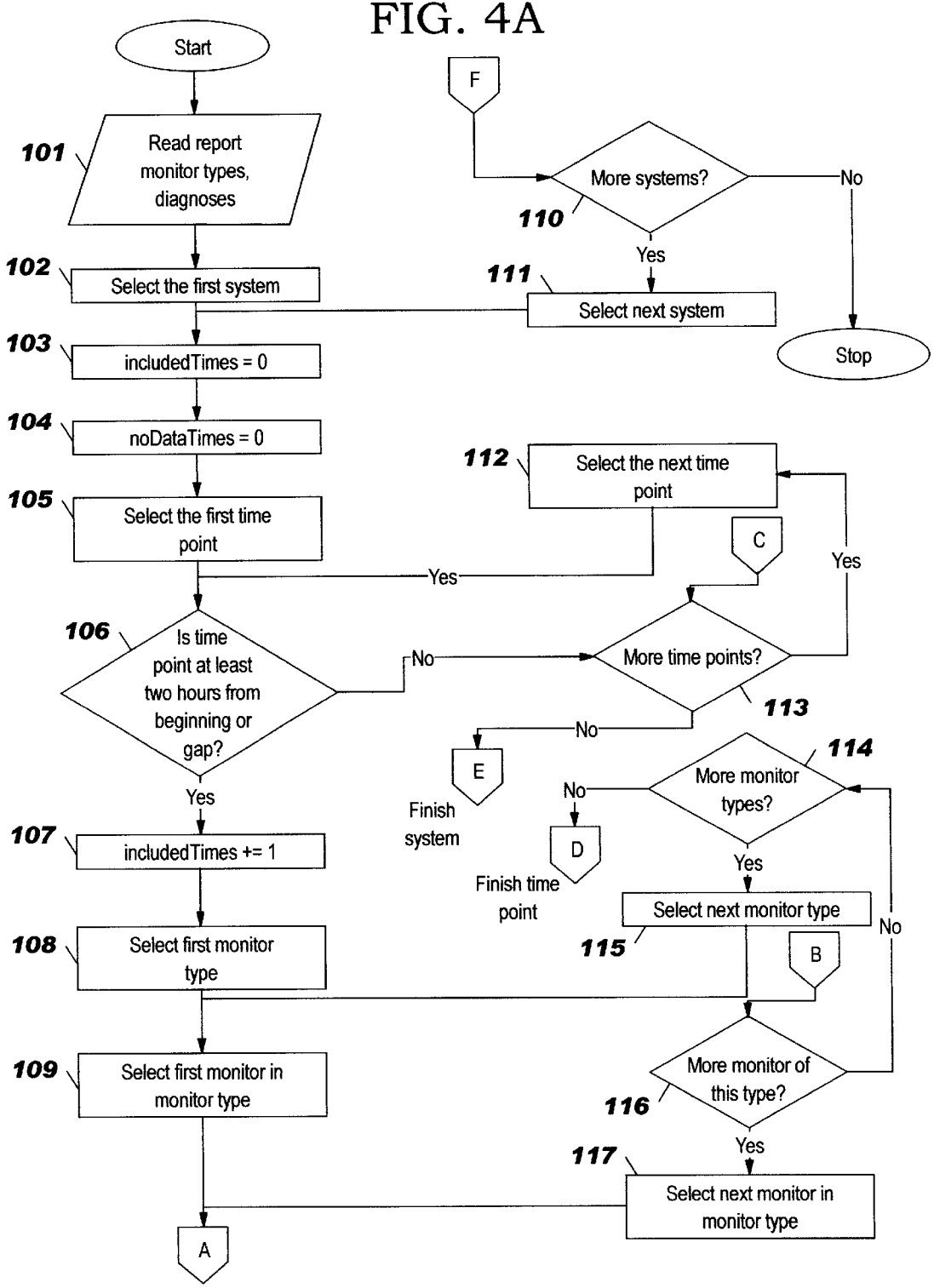
FIG. 4 (comprising FIGS. 4A, 4B, 4C and 4D) is a flow chart of logic of the preferred embodiment of the present invention.
FIGS. 4E, 4F and 4G are features of the latent bottleneck diagnosing features of the present invention.

This flowchart of FIG. 4A begins by reading the three inputs (report, monitor types and diagnosis). The flowchart shows that at the highest level, the method consists of several nested loops. The outer loop iterates through the systems in the report. This loop involves boxes 102, 110, and 111.

The next loop iterates through the time points in the report. This involves boxes 105, 112, and 113. This loop skips the time points that have less than two hours of consecutive data, via box 106. This is because the next flowchart will average the previous two hours of data If a time point is less than two hours into the report, then the method goes to the next time point in box 113 and 112. Likewise, if the time point is less than two hours after a gap, then the method goes to the next time point. A "gap" occurs when the user has requested a report that includes only certain days of the week and hours of the day. These are called "inclusion times" in the Performance Data Patent. For example, if only the hours 9:00 am to 5:00 pm are included in the report, then there is a gap in the data between 5:00 pm and 9:00 am the next day. The first two hours, from 9:00 am to 11:00 am, are skipped in this flowchart.

The time loop keeps a counter of how many time points were analyzed in box 107. This way it can leave out the times that were skipped in 106 when it does the analysis. The next loop iterates through the monitor types via boxes 108, 114, and 115. The final loop iterates through the monitors oft hat type in boxes 109, 116, and 117.

Figure 4B:
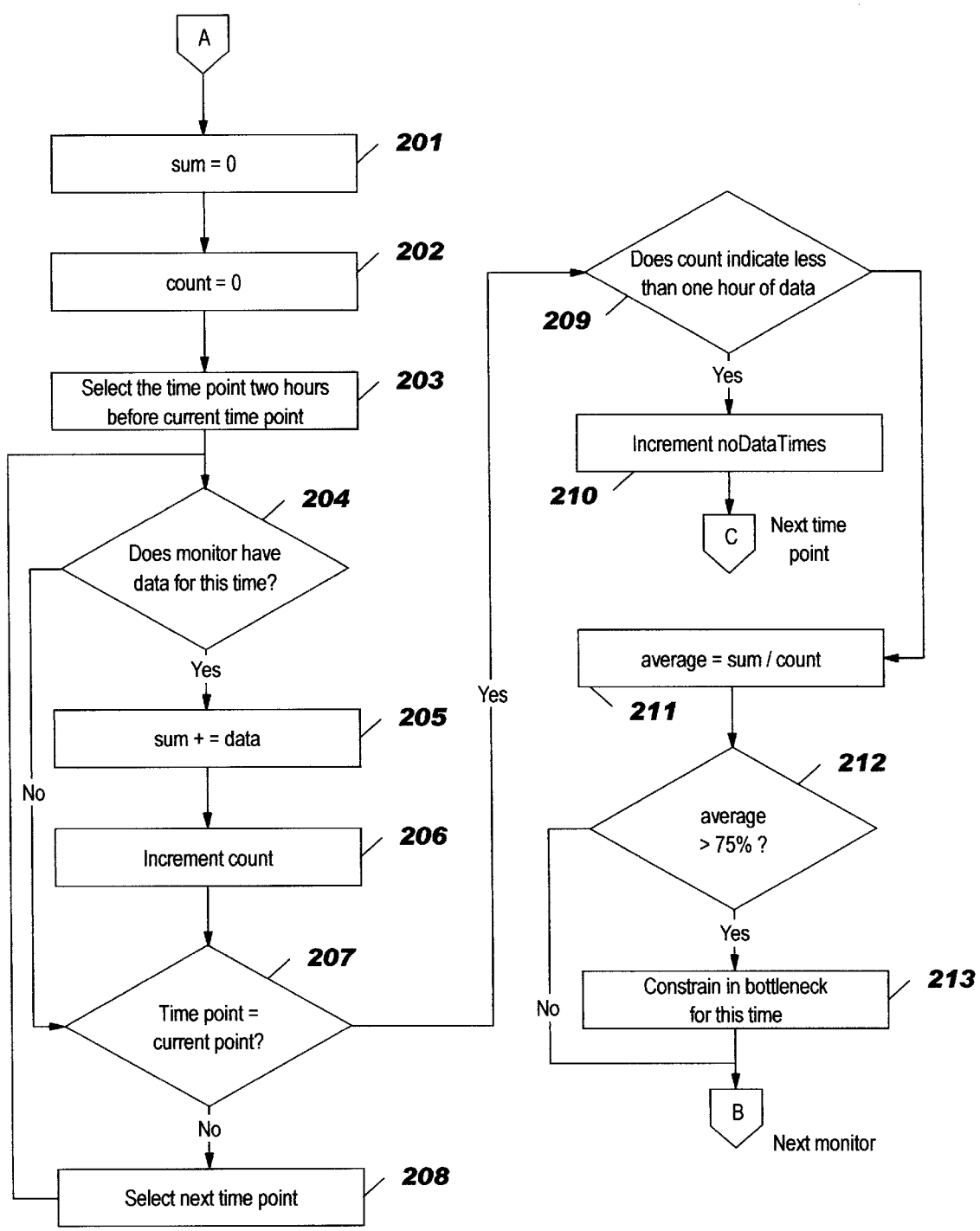

This flowchart of FIG. 4B shows how the method processes each monitor for each time point. In boxes 203 to 208, the method sums up the previous two hours of data. It rejects any time points where there is no data. This typically indicates that the system was turned off. Box 209 tests to see if the system was turned on at least half the time. If not, then the data is rejected for this time point and a counter is updated in box 210 in order to keep track of how much this condition has occurred. Note the assumption here that if one monitor does not have data for this time point, none of them do for the entire system, so we skip the other monitors and go to the next time point.

In box 211, the average is computed for the two hours. In 212, if the average is over 75%, then this monitor is constrained in 213.

By way of explaining 213, the method keeps a cumulative bottleneck for the current time point, and it adds to the bottleneck while it is processing the time point. The bottleneck contains the following information:

The frequency of the bottleneck (number of times it has occurred).

A list of the monitors that are constrained in the bottleneck, and the frequency of each one (number of times that it was constrained).

A list of the components that are constrained in the bottleneck, and the frequency of each one (number of times it was constrained).

The first time the bottleneck occurred.

The last time the bottleneck occurred.

The type of the bottleneck, which is determined by the component types involved in the bottleneck. This can be computed from the list of components.

The bottleneck is constrained in 213 during iterative passes through the loops. None of the frequencies in the bottleneck will exceed 1 since at this point, the bottleneck is only describing a single time point.

Figure 4C:
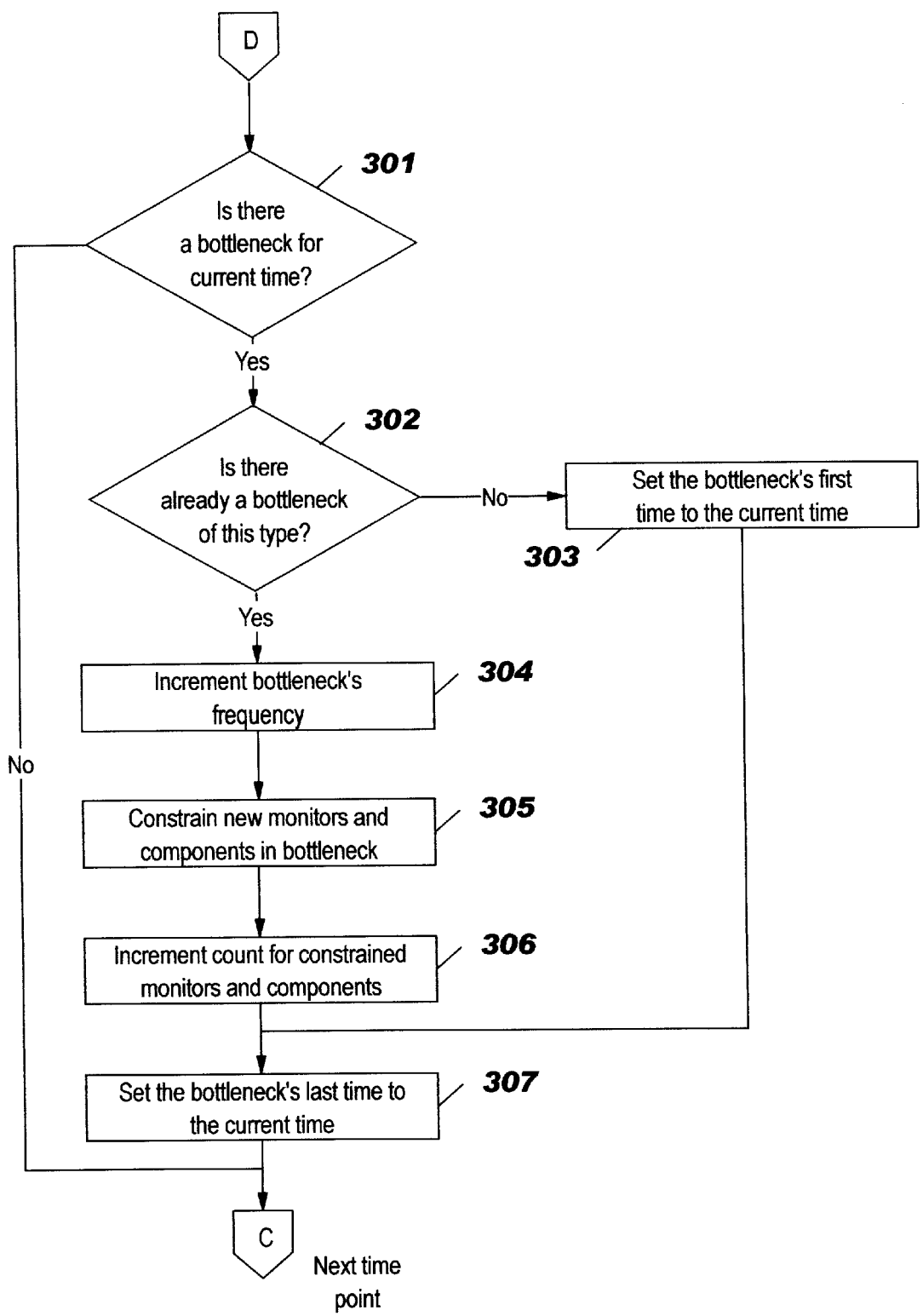

The flowchart of FIG. 4C shows how the method finishes processing each time point after it has processed each monitor.

Box 301 checks the cumulative bottleneck that contains the results of analyzing all of the monitors (see 213). If any of the monitors were bottlenecked, box 302 checks to see if there has already been a bottleneck for the same combination of component types. For each system, the method only keeps one bottleneck of each type. For example, there is only one CPU Bottleneck, only one Memory Bottleneck, only one CPU+Memory Bottleneck, and so forth. The types of components that are constrained determine the type of the bottleneck. If the same type of bottleneck has already occurred, the method updates the preexisting one in boxes 304 to 307. Otherwise, a new bottleneck of this type is added in box 303.

Figure 4D:
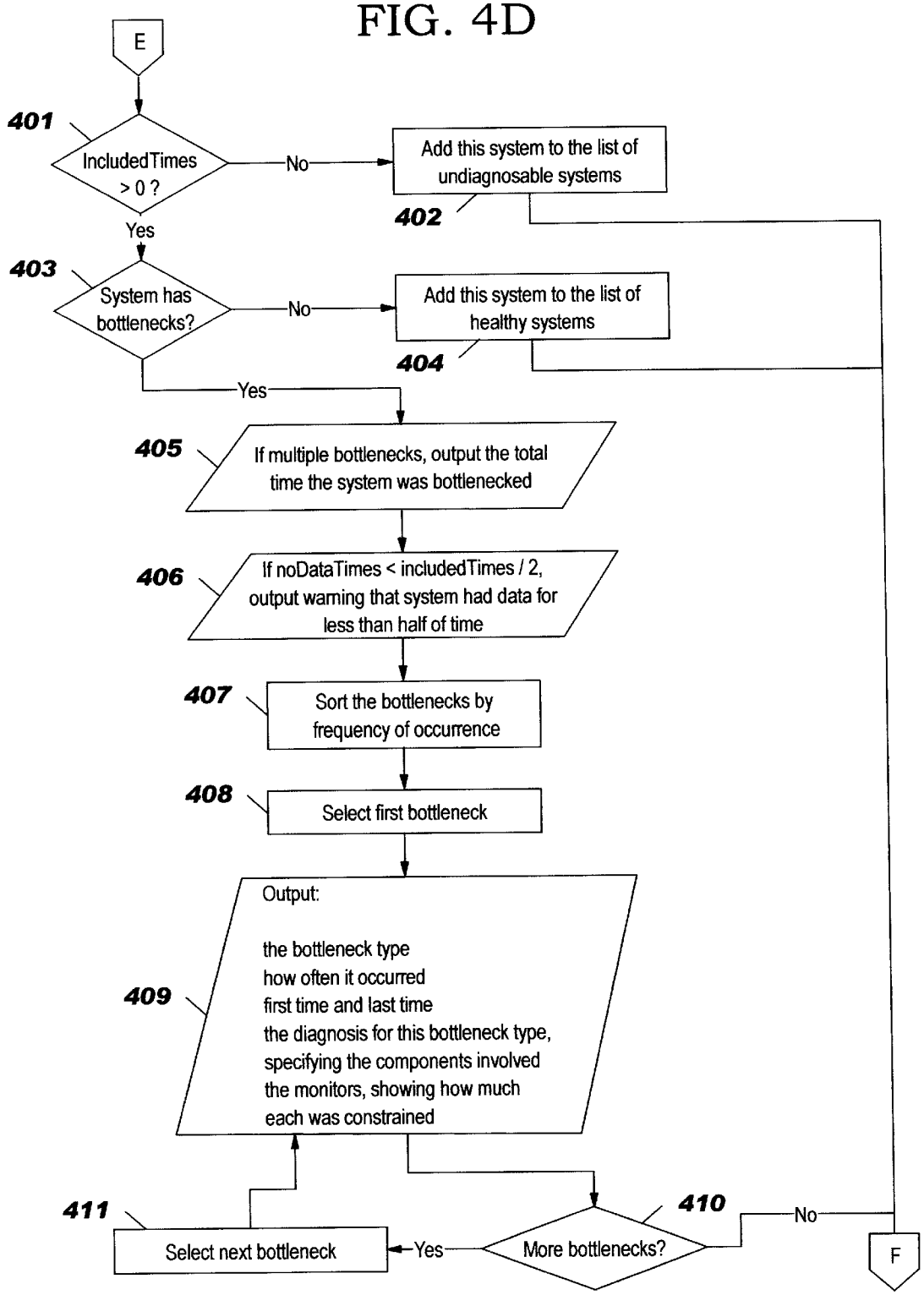

The flowchart of FIG. 4D shows how the method processes each system after all of the time points have been analyzed. Box 401 tests to see if included Times is nonzero. A zero value in this counter indicates that the system did not have two hours of consecutive data In this case, the system is added to the list of undiagnosable systems in box 402 and we go on to the next system.

Box 403 tests to see if the system has any bottlenecks. If none were created by the analysis, then this system is added to the list of healthy systems in box 404.

If there are multiple bottlenecks, box 405 outputs the total time that the system was bottlenecked. If there is only one bottleneck, then there is no need to do this because it will be obvious to the user.

If a system does not have data for at least half the time, then box 406 warns the user that the diagnosis is less reliable. This is computed with the counters that were updated in 107 and 210.

Box 407 sorts the bottlenecks by frequency of occurrence. Recall that there is only one bottleneck of each type, containing the accumulated instances of that bottleneck throughout the report. The bottleneck type that occurred most frequently is listed first.

Box 409 outputs each bottleneck type that has occurred for the system. It uses the process outlined above (in item 2 of the method's inputs) to select the appropriate diagnosis for this bottleneck type. It fills out the diagnosis with the specific components and monitors that contributed to the bottleneck, and how much each one was constrained.

The flowcharts do not show the following features of an embodiment of the present invention which may be added, as desired, by one of ordinary skill in the field: The systems are sorted according to total frequency of bottleneck. Hence, the system that is bottlenecked the most is output first. The output is organized into Recommendations and Details. Each system is tested to see if it contains at least one monitor for each component type. Otherwise it is added to the undiagnosable list. If the user clicks on one of the underlined monitor names, the system displays a graph of that monitor. It would be trivial for one skilled in the art to add these enhancements.

The method uses several values that can be modified by the user. The threshold for each monitor defaults to 75%, but can be changed on a per-monitor basis. Other customizable numbers include: The length of the sliding average. The default is two hours. How much of the sliding average must contain data. The default is 50%. What percentage of the report interval must have data for the server before a warning is issued; the default is 50%. What percentage of the report interval must a bottleneck exist for in order to be listed in the Recommendations section; default is 25%.

Often when you fix one bottleneck, there will be another waiting to happen, but did not because the system was slowed by the first bottleneck. The bottleneck that is currently happening is a realized bottleneck while the one waiting to happen is a latent bottleneck. If one or more of a component's monitors are above the latent threshold while another component is constrained, it is considered a latent bottleneck. This means that when the constrained component is remedied, the components that are above the latent threshold could move above the constrained threshold as the entire system begins to perform faster. Note that in order to be reported, a latent bottleneck must occur for most of the time in the realized bottleneck.

Sample of Output

Following is an example of text that is output by the preferred embodiment of the invention. This is identical to the output from the disclosure "Passive Method of Predicting and Diagnosing Bottlenecks," except that System B has a latent bottleneck in both the Recommendations and the Details, and System C has a latent bottleneck in the Details only. System C's latent bottleneck does not appear in the Recommendations because of two reasons. First, the latent bottleneck occurs inside of a realized bottleneck which does not appear in the Recommendations; if the realized bottleneck is not listed, then neither is the latent one. Second, only latent bottlenecks that occur for over 50% of the realized bottleneck time appear in the Recommendations.

Performance Analysis Recommendations
System E Go to details
Bottleneck: LAN Adapter. To improve performance:
 Add faster LAN technology to LAN Segment 0.
 Add another LAN adapter and migrate users from LAN Segment 0 to the new LAN subnet.
System B Go to details
Bottleneck: CPU. To improve performance:
 Upgrade to faster or additional CPUs.
 After fixing this bottleneck, you may experience the following latent bottlenecks:
 Latent Bottleneck: LAN Adapter. To improve performance:
  Add faster LAN technology to LAN Segment 0.
  Add another LAN adapter and migrate users from LAN Segment 0 to the new LAN subnet.
System C Go to details
Bottleneck: Memory+Disk. To improve performance:
 Install at least 128 Megabytes more memory. Excessive memory utilization is probably causing disk swapping. If additional memory does not alleviate the problem, perform further diagnosis.
System A Go to details
Bottleneck: LAN Adapter. To improve performance:
 Add faster LAN technology to LAN Segment 0.
 Add another LAN adapter and migrate users from LAN Segment 0 to the new LAN subnet.

Figure 4E:
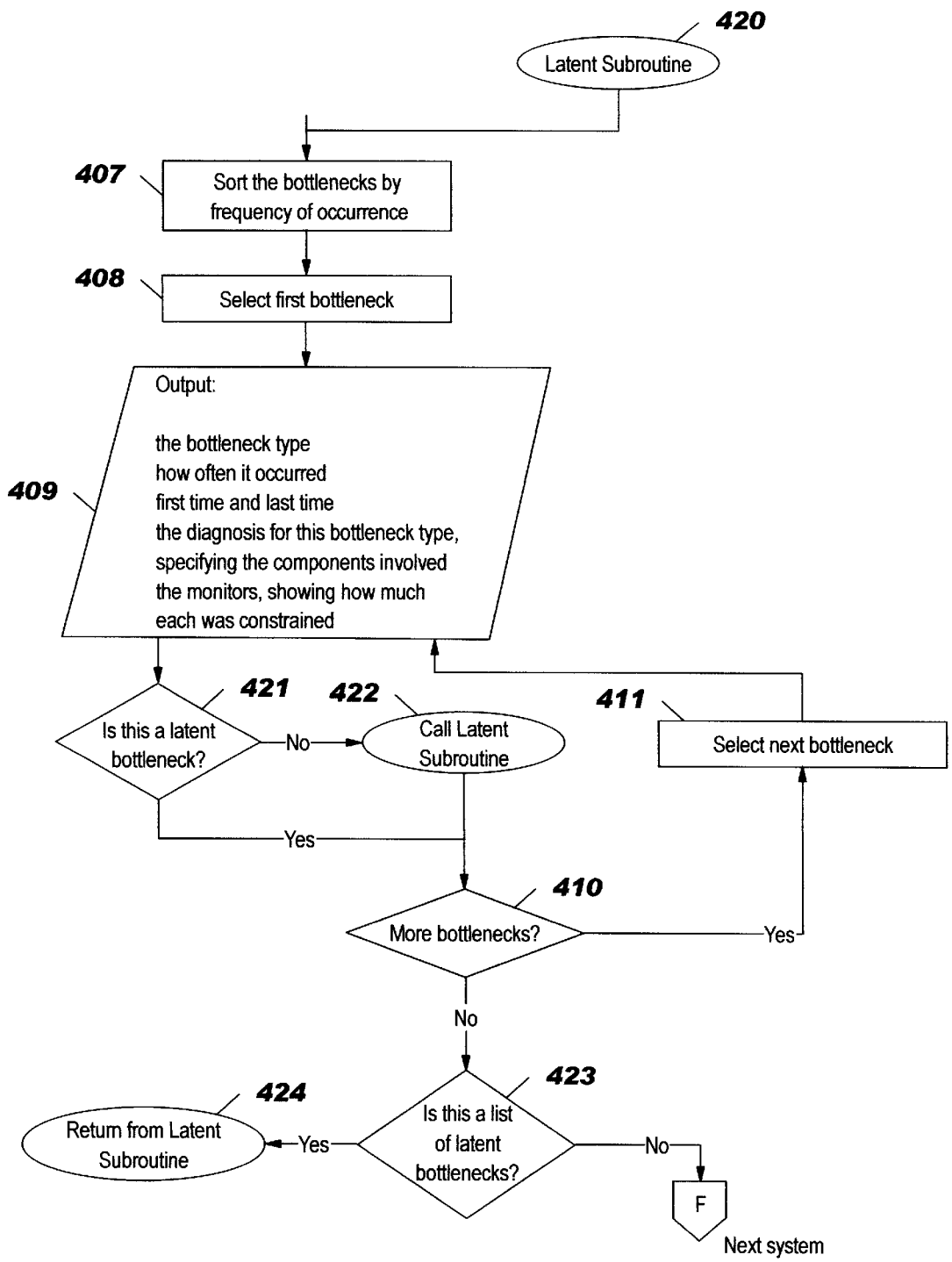
Figure 4F:
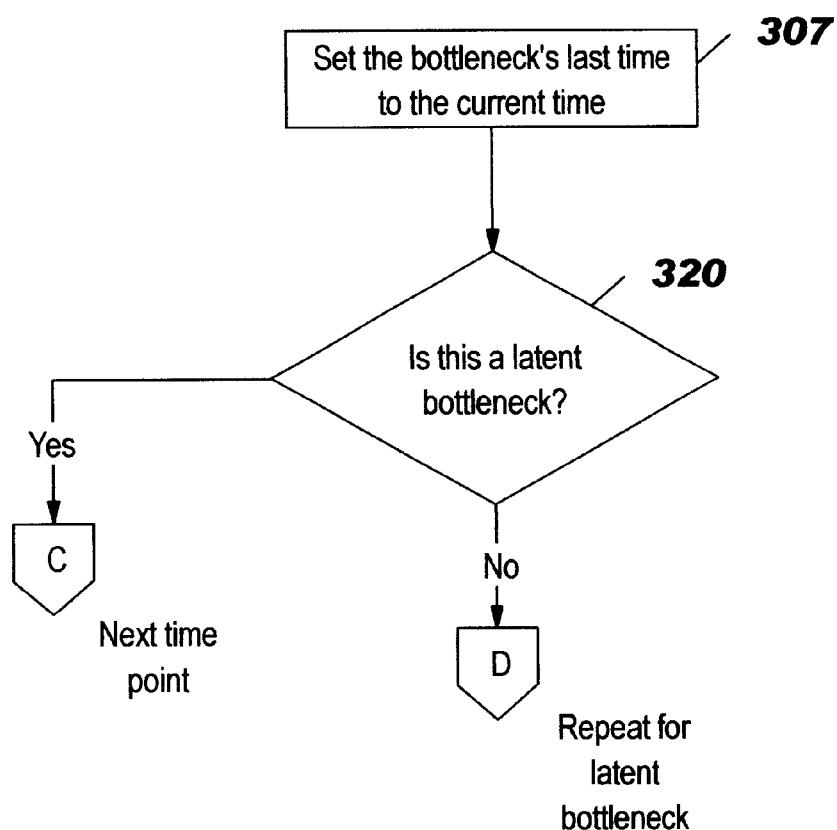
Figure 4G:
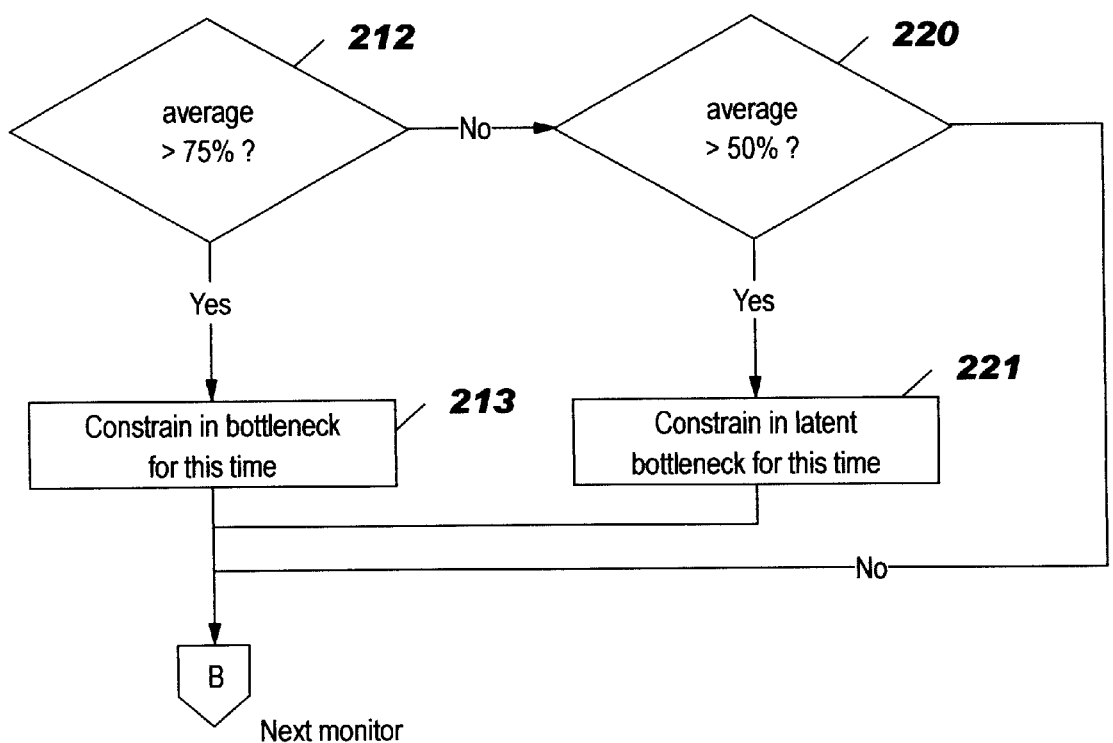

FIGS. 4E, 4F and 4G illustrate the present invention of latent bottlenecks as follows: The invention is an automated method of detecting and diagnosing computer system latent bottlenecks utilizing passive monitoring techniques. A latent bottleneck is a bottleneck that is suppressed by another (actual or realized) bottleneck. Typically when the realized bottleneck is alleviated, the latent bottleneck will become realized.

This invention builds on the patents referenced above, including the Performance Data Patent, the Performance Display Patent and the Performance Prediction Patent. It has the advantages listed in these patents, plus the following:

It tells the user what new bottleneck to expect after the current one is remedied. It is common for a system administrator to successfully fix a bottleneck, only to discover that a second bottleneck was waiting behind the first one and must also be fixed immediately. Th e user who knows about the second bottleneck ahead of time can be prepared to fix both at once.

Detecting latent bottlenecks improves the quality of recommendations for alleviating realized bottlenecks because these recommendations are more likely to yield appreciable gains in system performance. It detects and diagnosis the latent bottlenecks using the same mechanism as the realized bottlenecks. No additional input is required since it uses the same monitor types, diagnoses, and report. The output has the same format and features as the realized bottlenecks. It works with the forecasted data as well as with real data, so that latent bottlenecks can be forecasted.

Explanation of Latent Bottlenecks

Often when you fix one bottleneck, there will be another waiting to happen, but did not because the system was slowed by the first bottleneck. The bottleneck that is currently happening is a realized bottleneck while the one waiting to happen is a latent bottleneck. If one or more of a component's monitors are above the latent threshold while another component is constrained, it is considered a latent bottleneck. This means that when the constrained component is remedied, the components that are above the latent threshold could move above the constrained threshold as the entire system begins to perform faster. Note that in order to be reported, a latent bottleneck must occur for most of the time in the realized bottleneck.

Sample of Output

Following is an example of text that is output by the preferred embodiment of the invention. This is identical to the output from the disclosure "Passive Method of Predicting and Diagnosing Bottlenecks," except that System B has a latent bottleneck in both the Recommendations and the Details, and System C has a latent bottleneck in the Details only. System C's latent bottleneck does not appear in the Recommendations because of two reasons. First, the latent bottleneck occurs inside of a realized bottleneck which does not appear in the Recommendations; if the realized bottleneck is not listed, then neither is the latent one. Second, only latent bottlenecks that occur for over 50% of the realized bottleneck time appear in the Recommendations.

Performance Analysis Recommendations
System E Go to details
Bottleneck: LAN Adapter. To improve performance:
 Add faster LAN technology to LAN Segment 0.
 Add another LAN adapter and migrate users from LAN Segment 0 to the new LAN subnet.
System B Go to details
Bottleneck: CPU. To improve performance:
 Upgrade to faster or additional CPUs.
 After fixing this bottleneck, you may experience the following latent bottlenecks:
 Latent Bottleneck: LAN Adapter. To improve performance:
  Add faster LAN technology to LAN Segment 0.
  Add another LAN adapter and migrate users from LAN Segment 0 to the new LAN subnet.
System C Go to details
Bottleneck: Memory+Disk. To improve performance:
 Install at least 128 Megabytes more memory. Excessive memory utilization is probably causing disk swapping. If additional memory does not alleviate the problem, perform further diagnosis.
System A Go to details
Bottleneck: LAN Adapter. To improve performance:
 Add faster LAN technology to LAN Segment 0. Add another LAN adapter and migrate users from LAN Segment 0 to the new LAN subnet.

Performance Analysis Details
System E Details
Bottleneck: LAN Adapter. This bottleneck occurred 140 out of the 180 hours that this system was analyzed, or 78% of the time. It was observed between Mon. Aug. 10, 1998 11:00 EDT and Mon. Sep. 7, 1998 16:00 EDT.
To graph the constrained resources, click on:
 NDIS—Adapter 0—Packets Received (constrained for 94% of the 26 hours of bottleneck time)
 NDIS—Adapter 0—Packets Transmitted (constrained for 33% of the 26hours of bottleneck time)
To improve performance:
 Add faster LAN technology to LAN Segment 0.
 Add another LAN adapter and migrate users from LAN Segment 0 to the new LAN subnet.
System B Details
Bottleneck: CPU. This bottleneck occurred 119 out of the 189 hours that this system was analyzed, or 63% of the time. It was observed between Tue. Aug. 11, 1998 10:00 EDT and Mon. Aug. 31, 1998 10:00 EDT.

To graph the constrained resources, click on:
   CPU Utilization (constrained for 100% of the 119 hours of bottleneck time)
To improve performance:
   Upgrade to faster or additional CPUs.
After fixing this bottleneck, you may experience the following latent bottlenecks:
   Latent Bottleneck: LAN Adapter. This latent bottleneck occurred 71 out of the 119 hours that the realized bottleneck occurred, or 60% of the time. It was observed between Tue. Aug. 11, 1998 10:00 EDT and Fri. Aug. 28, 1998 16:00 EDT.
   To graph the constrained resources, click on:
   NDIS—Adapter 0—Packets Received (constrained for 66% of the 71 hours of bottleneck time)
   NDIS—Adapter 0—Packets Transmitted (constrained for 64% of the 71 hours of bottleneck time)
   To improve performance:
   Add faster LAN technology to LAN Segment 0.
   Add another LAN adapter and migrate users from LAN Segment 0 to the new LAN subnet.
System C Details
The following bottlenecks occurred for a total of 110 out of 189 hours in the report, or 58% of the time.
Bottleneck: Memory+Disk. This bottleneck occurred 76 out of the 189 hours that this system was analyzed, or 40% of the time. It was observed between Mon. Aug. 24, 1998 10:00 EDT and Mon. Sep. 7, 1998 16:00 EDT.
To graph the constrained resources, click on:
   Disk 1: Utilization (constrained for 100% of the 76 hours of bottleneck time)
   Memory Usage (constrained for 100% of the 76 hours of bottleneck time)
To improve performance:
   Install at least 128 Megabytes more memory. Excessive memory utilization is probably causing disk swapping. If additional memory does not alleviate the problem, perform further diagnosis.
Bottleneck: Memory. This bottleneck occurred 25 out of the 189 hours that this system was analyzed, or 13% of the time. It was observed between Tue. Aug. 18, 1998 13:00 EDT and Fri. Sep. 04, 1998 15:00 EDT.
To graph the constrained resources, click on: Memory Usage (constrained for 100% of the 25 hours of bottleneck time)
To improve performance: Install at least 128 Megabytes more memory.
After fixing this bottleneck, you may experience the following latent bottlenecks:
   Latent Bottleneck: Disk. This latent bottleneck occurred 10 out of the 25 hours that the realized bottleneck occurred, or 40% of the time. It was observed between Mon. Aug. 24, 1998 11:00 EDT and Fri. Sep. 04, 1998 15:00 EDT.
   To graph the constrained resources, click on:
   Disk 1: Utilization (constrained for 100% of the 13 hours of bottleneck time)
   To improve performance:
   Add additional disks to Disk Device 1.
   Migrate active data files from Disk Device 1 to other disk devices in the system.
   The disk controller for Disk Device 1 could also be causing a bottleneck. If this disk controller has a large number of disk drives attached, install another disk controller with additional disk drives.
   Consider upgrading Disk Device 1 to a faster disk drive technology.
Bottleneck: Disk. This bottleneck occurred 8 out of the 189 hours that this system was analyzed, or 4% of the time. It was observed between Mon. Aug. 24, 1998 15:00 EDT and Wed. Aug. 26, 1998 11:00 EDT.
To graph the constrained resources, click on: Disk 1: Utilization (constrained for 100% of the 8 hours of bottleneck time)
To improve performance:
   Add additional disks to Disk Device 1.
   Migrate active data files from Disk Device 1 to other disk devices in the system.
   The disk controller for Disk Device 1 could also be causing a bottleneck.
   If this disk controller has a large number of disk drives attached, install another disk controller with additional disk drives.
   Consider upgrading Disk Device 1 to a faster disk drive technology.
System A Details
Bottleneck: LAN Adapter. This bottleneck has not occurred yet, but it may occur on Tue. Sep. 29, 1998.
To graph the constrained resources, click on:
   NDIS—Adapter 0—Packets Received
To improve performance:
   Add faster LAN technology to LAN Segment 0.
   Add another LAN adapter and migrate users from LAN Segment 0 to the new LAN subnet.
System D Details
The system had enough data to be analyzed for only 90 out of 189 hours, or 47% of the time. You should not a act on a of forecasted bottleneck unless the system is on for 50% of the time.
Bottleneck: Disk. This bottleneck has not occurred yet, but it may occur on Wed. Sep. 16, 1998.
To graph the constrained resources, click on: Disk 2: Utilization
To improve performance:
   Add additional disks to Disk Device 2.
   Migrate active data files from Disk Device 2 to other disk devices in the system.
   The disk controller for Disk Device 2 could also be causing a bottleneck.
   If this disk controller has a large number of disk drives attached, install another disk controller with additional disk drives.
   Consider upgrading Disk Device 2 to a faster disk drive technology.

The present invention modifies several flowcharts from FIGS. 4A–4D, from the System Recommendation Patent. FIG. 4G makes changes to the flowchart for processing each monitor in FIG. 4B, using 212 and 213 as reference points. Originally, if 212 did not find a constrained monitor, it always went on to the next monitor via "B." The revised flowchart checks in 220 to see if the unconstrained monitor is in the latent state, defined as between 50% and 75%. Recall that the method already keeps a bottleneck for the current time point which it updates in 213 each time it finds a new constrained monitor. Now the method keeps an additional bottleneck, called the latent bottleneck, which it updates in 221 each time it finds a latent monitor.

The next flowchart modification requires an addition to the bottleneck structure. Previously a bottleneck contained a frequency, a list of monitors and their frequencies, a list of component types and their frequencies, and some times tamps. Now a bottleneck will also contain a list of bottlenecks. In object-oriented terminology, the bottleneck has a "composite design pattern". This simply means that it can contain instances of itself.

The purpose of this change is to allow each realized bottleneck to contain a list of latent bottlenecks. The list of latent bottlenecks in each realized bottleneck has nearly the same behavior as the list of realized bottlenecks for the system. The realized and latent bottlenecks are constructed using the same code, as the last flowchart demonstrated. The lists of realized and latent bottlenecks are maintained using the same code, as the FIG. 4F demonstrates.

The result of this change is that the entire flowchart in the original disclosure executes twice. For each time point, there can be one realized bottleneck and one latent bottleneck. The realized bottleneck is processed on the first pass through this flowchart. It is added to the system's list of bottlenecks in 302–307, either by being inserted into the list or by being merged with a preexisting bottleneck of the same type. At the end of this first pass, box 320 checks to see if the realized bottleneck is latent, which of course it is not. Then control jumps back to "D" and the entire process is repeated. However, the second time through the flowchart, instead of the system's list of realized bottlenecks, the process uses the realized bottleneck's list of latent bottlenecks. The latent bottleneck for this time point is either inserted into the list or merged with a preexisting latent bottleneck of the same type.

If no realized bottleneck exists for the current time, then control moves from box 301 to "C" where it goes to the next time point without ever considering the latent bottleneck for the time point. This is because monitors above the latent threshold are only a potential problem when the system is being slowed down by a realized bottleneck.

After each time point is analyzed for the current system, the last flowchart outputs the results for the system. This flowchart must be modified as shown in FIG. 4E. in this figure or flowchart, two loops are in progress at the same time. In the outer loop, the realized bottlenecks in the system are processed just as they were before. Control passes from 409 to 421, through 422 to 410. It iterates through the list by going from 410 to 411 and back to 409 again. When the list ended, control passes through 423 and exist via "F" just as before.

The only effective difference in the above scenario is that subroutine 422 is added to the flow of control for realized bottlenecks. Subroutine 422 executes the entire process all over again by jumping to 420, but instead of using the realized bottlenecks for each system, it uses the latent bottlenecks in each realized bottleneck. When the process starts from 420, the branch at 421 avoids making the 422 call again. Likewise, when all the latent bottlenecks are finished for a realized bottleneck, the branch at 423 causes the subroutine to return so that control proceeds to 410.

Hence, in the output after each realized bottleneck is listed, each of its latent bottlenecks is listed. The appearance of the latent bottlenecks is very similar to the realized bottlenecks, with indentation and font changes used to distinguish them. Refer to the sample output for an illustration in FIG. 9 and 10.

Figure 5:
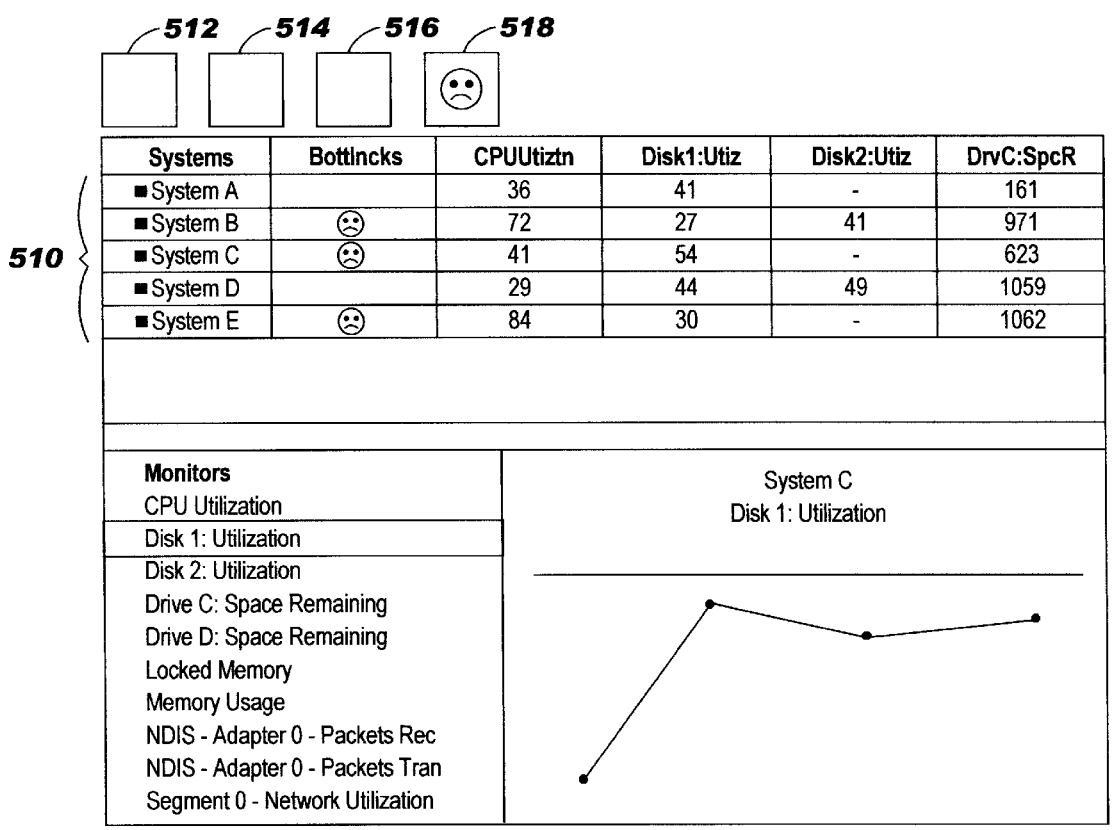

FIGS. 5–7 are examples of displays (or reports) from the present invention. FIG. 5 is an output from the system of the present invention, preferably with a top part in the form of a HTML page available for review over an intranet or the Internet. A top pane 510 (e.g., in FIG. 5) is used to select a system to graph. (In some situations, it also selects a monitor, though the lower left pane is usually used for this.) Four buttons 512, 514, 516 and 518 at the top control the top pane. There are four options for the top pane: The first button 512 displays a table in the top pane. This button is currently selected, as is indicated by the box around the button. The table is currently displayed in the top pane. The first column has the heading "System" and lists all of the systems with their icons. The second button 514 displays a list of icons in the top pane. This allows a large number of systems to be viewed at once, using the same icons that are seen in the first column of the table. The third button 516 displays the HyperGraph in the top pane. The system icons are positioned on a graph but are still functional as icons, as described in the Performance Display patent. The fourth button 518 displays the Performance Analysis output in the top pane. The first three buttons are as described in the Performance Display Patent referenced above. However, the fourth button 518 is new and is used to access the invention. The button has a face that is frowning to indicate that at least one of the analyzed systems has a problem with a recommended remedy. If no problems were found, an appropriate symbol such as a smiling face would be displayed. If analysis were in progress, the face would have its eyes closed in a thoughtful expression. If analysis is not possible due to insufficient data, then the face would look dead. Of course, the selection of the appropriate symbols is within the selection of the designer, so long as the user can understand the results.

Now, FIG. 6 results when the fourth button is selected. The top pane shows the Recommendations, as described in the disclosure. The bottom two panes are unchanged.

Notice that "Go to details" is underlined for each system. This is the conventional way of indicating a hyperlink which the user should click on. Suppose the user clicks on the hyperlink for "Go to details" for System B, resulting in FIG. 7

The scroll bar has moved down to a later portion of the output where the details of System B's bottlenecks are given. The bottom two panes have not changed. However, now suppose the user selects "CPU Utilization" which is underlined in the top pane. The screen of FIG. 8 results.

It is desirable to measure and record the utilization of each component type by using some combination of monitor types. For each type of component, there are alternative types of monitors that could be used to determine the utilization. The above monitor types are the ones that were most convenient in the preferred embodiment, and are given by way of example. Other types of monitors that could be used include LAN bytes per second, LAN packets or frames per second, CPU instructions per second, disk I/O operations per second, and disk bytes per second read and written. The preferred embodiment runs on a platform that provides a number of monitors, such as IBM's Netfinity or Tivoli software.

The monitors are considered "passive" because they observe the systems without effecting them. Other performance analysis methods use active techniques. (For example, see BlueCurve Dynameasure by Bluecurve, Inc. 2201 Broadway, Suite 700 Oakland, Calif. 94612.) These methods intentionally induce artificial workloads in the systems in order to determine performance characteristics. The drawbacks of this approach are that it is disruptive to the network, and the artificial load on the network may not resemble the actual load in the real world. The subject invention avoids these drawbacks by using passive monitors.

Experimentation has shown that a server's response time begins to increase exponentially when resource utilization reaches a threshold that is between 60% and 80%. (See Computer-Communications Network Design and Analysis, Mischa Schwartz, Prentice-Hall, Inc. Englewood Cliffs, N.J. 07632.) The preferred embodiment considers a component constrained when one of the above performance monitors averages over 75% for a period of at least two hours. A component meeting this criterion will noticeably degrade the server's performance. In our model it does not matter whether the monitor value that constrained the component is 76% or 100%, because a component is either constrained or not constrained. Though the invention allows the user to adjust the 75% threshold for each monitor, the user is advised to leave the threshold at its default.

A "bottleneck" occurs on a system when one or more of its components are constrained. A bottleneck is identified by a unique combination of constrained component types. For example:

If CPU 1 is constrained at a particular time, this is a CPU bottleneck. If CPU 2 is constrained at a later time, it is also a CPU bottleneck. The invention considers these two bottlenecks to be one bottleneck for much of the analysis. This illustrates that it is the component type that defines a bottleneck, and not the specific component.

If the "Network Utilization for Adapter 1" monitor is constrained at a particular time, this is a LAN bottleneck. If the "Packets Transmitted by Adapter 1" monitor is constrained at a later time, this is also a LAN bottleneck. The invention considers these two bottlenecks to be one bottleneck for much of the analysis. This illustrates that it is the component type that defines a bottleneck, and not the specific monitor or monitor type.

If CPU 1 and LAN Adapter 1 are both constrained, it is a CPU+LAN bottleneck. It is not two bottlenecks, but one. This illustrates that it is the combination of component types that defines a bottleneck.

Since there are four component types in the preferred embodiment, there are fifteen possible bottleneck types. (This is two raised to the fourth power, minus one for the case of zero which means no bottleneck.) Each of the fifteen bottleneck types has a different diagnosis. This is best explained by a few examples:

If Disk 1 is constrained, it causes a disk bottleneck. The user is advised to add disks or to move active data files from Disk 1 to under-utilized disks to better balance the disk workload.

If CPU 1 is constrained, it causes a CPU bottleneck. The user is advised to upgrade to faster or additional CPUs.

If memory is constrained, it causes a memory bottleneck. The user is advised to add the appropriate amount of memory.

If CPU 1 and memory are both constrained, it causes a memory+CPU bottleneck. The user is advised to add memory AND to upgrade to faster or additional CPUs. In this case, the recommendation is simply the combined recommendations for the individual components.

If memory is constrained and one or more disks are constrained at the same time, it is a memory+disk bottleneck. The user is advised to add memory. The user is NOT advised to add disks or to move active data files from Disk 1 to under-utilized disks. The invention realizes that the constrained memory is most likely causing disk thrashing, so there is no benefit in working with the disk devices. In this case, the recommendation is NOT the combined recommendations for the individual components. After a memory upgrade is performed the invention can be used in an iterative fashion to re-analyze the status of the system. The invention would then correctly identify unlikely cases when combinatorial bottlenecks such as memory and disk I/O occur that are not related.

The last example shows that components in a bottleneck can interact. If a type of component is in a bottleneck with other types of components, it may mean something completely different than if the component type is in a bottleneck alone. This is why each combination of component types (memory, disks, LAN adapters, CPUs) causes a different type of bottleneck.

The invention gives suggestions to the user which include information about the specific components and monitors that created the bottleneck. The type of bottleneck, and hence the diagnosis, is determined only by the component types. But the specific components and monitors must be included in the diagnosis so that the user has enough information to address the problem.

Figure 9:
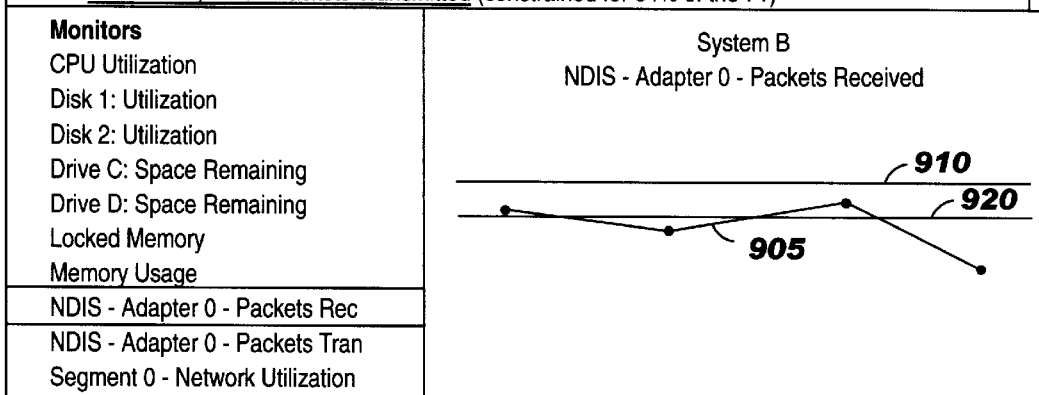
FIGS. 9 and 10 illustrate output or displays (a kind of report) from the system of the present invention, illustrating the latent bottleneck features of the present invention.
Figure 10:
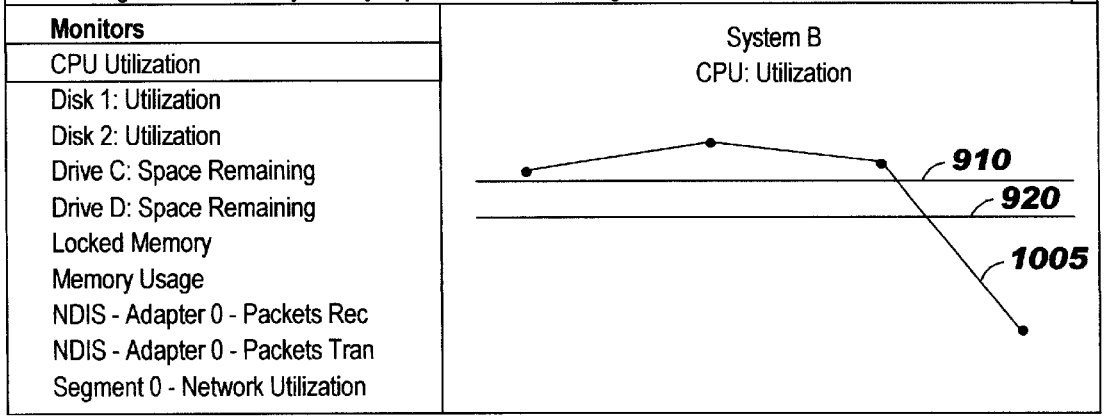

FIGS. 9 and 10 illustrate the results of the present invention. The results of the analysis are shown by line 905. A first threshold of approximately 75% of capacity is shown at the first threshold line 910 and a second, lower, or latent threshold is shown by the line 920 in FIG. 9. Again, in FIG. 10, the results of the analysis are shown by line 1005, shown with the first threshold 910 and the second, lower or latent threshold 920.

Other embodiments may use different component types than the four that are used in the preferred embodiment. In particular, additional component types are anticipated to watch for additional kinds of bottlenecks and other problems, such as running out of free space on a disk drive. However, if any of the four component types of the preferred embodiment are absent, incorrect diagnosis of bottlenecks is likely. This is because a component type that is constrained will contribute to a bottleneck, but if it is not detected by the invention, then either no bottleneck will be detected at all or the bottleneck will be misinterpreted.

Many modifications of the present invention will be apparent to those skilled in the arts to which the present invention applies. Further, it may be desirable to use some of the features of the present invention without the corresponding use of other features. For example, the present invention has been described in the context of monitoring hardware performance and in making recommendations for changes in the hardware to improve the performance of the system, while software forms an integral part of the present invention and defines many of the capabilities of the system. Analysis of the performance of software and consideration of changes to the software could be accomplished in a rather straight forward way without departing from the spirit of the present invention. Further, the interaction between the hardware and the software components could be used to advantage in monitoring performance of the combined system, and those skilled in the relevant arts would be able to include software indicators of performance, if desired. Furthermore the performance of other elements of the hardware and additional rules could be added to the system described without difficulty, and the use of other rules could be used with good results. Accordingly, the foregoing description of the present invention should be considered as merely illustrative of the principles of the present invention and not in limitation thereof.

Having thus described the invention, what is claimed is:

1. A method of analyzing performance of a computer system and for providing recommendations for changes in the system to improve its performance, the steps of the method comprising:

receiving and storing indicators of the performance of components of the computer system at periodic times;

applying stored rules to the stored indicators to analyze the performance of the computer system;

detecting undesirable conditions of the computer system when the stored indicators exceed a first stored threshold and in those instances where an undesirable condition has been determined, detecting a condition where another indicator is above a second lower threshold; and identifying the presence of a latent bottleneck;

in response to the detecting of an undesirable condition of the computer system and a latent bottleneck, providing a recommendation to alleviate the performance of the computer system by providing a recommendation to improve the undesirable condition as well as the latent bottleneck.

2. A method of analyzing the computer system including the steps of claim 1, and further including the step of analyzing the undesirable conditions to determine the most severe undesirable condition and reporting it first.

3. A method of analyzing performance of a computer system and providing a report on the bottleneck of the type described in claim 1 where the step of analyzing the bottleneck conditions includes the step of identifying the most severe bottleneck and the step of providing a report includes as a first item the remedy recommended for the most severe bottleneck.

4. A method of analyzing the performance of a computer system and further providing a report on the bottleneck according to claim 1 wherein the step of providing a recommendation includes the step of preparing a report in an Internet format and includes making the report available for delivery over the Internet.

5. A method of analyzing the performance of a computer system including the steps of claim 1 and further including the step of providing an indication when the data from such analyses is unreliable.

6. A method of analyzing performance of a computer system including the steps of claim 1 wherein the method further includes the steps of determining at least one remedy for a detected bottleneck condition and providing a report of the bottleneck which has been detected and the remedy for the bottleneck.

7. A system for determining a bottleneck condition and for recommending an action to alleviate the bottleneck condition, the system comprising:

a first module for receiving and storing indicators of system performance over a period of time;

a second module for applying rules to the stored indicators to determine whether an undesirable condition exists and, if it does exist, for generating a recommendation for ameliorating the condition;

a third module for applying a second, lower threshold to other indicators of system performance where an undesirable condition has been determined for identifying a latent bottleneck; and providing an output indicating the undesirable condition and the latent bottleneck, including a recommendation for ameliorating the undesirable condition and the latent bottleneck.

8. A media with a program stored thereon, the stored program having:

a module for receiving and storing indicators of performance of a computer system over a time period;

a module for applying rules to determine if the system has a bottleneck and for providing a recommendation to ameliorate the bottleneck condition;

a module for reporting the bottleneck condition and the recommendation for ameliorating the bottleneck condition; and a module for identifying a latent bottleneck in a system with a bottleneck condition, said module including a lower threshold for identifying the latent bottleneck and a module for making recommendations for improving the bottleneck condition and the latent bottleneck condition.

9. A media with a stored program including the elements of claim 8 wherein the program includes a module for determining which of several bottlenecks is the most serious and for presenting the most serious bottleneck first in the report of the bottleneck conditions.

10. A method of analyzing the performance of a computer system including the steps of claim 1 and further including a step of disregarding certain periods of performance in order to avoid the impact on the analysis of periods not particularly relevant to the users of the system.

11. The method according to claim 10 where at least one of the periods disregarded on the analysis is, a weekend.

* * * * *